United States Patent
Mackin et al.

(10) Patent No.: US 7,000,746 B2
(45) Date of Patent: Feb. 21, 2006

(54) ELECTRIC CORD REEL

(75) Inventors: Michael P. Mackin, Chicago, IL (US); Scott A. Hagen, Mount Prospect, IL (US); Timothy A. Hill, Elgin, IL (US); Don Zito, Fox River Grove, IL (US); Gregory J. Maley, Downers Grove, IL (US)

(73) Assignee: Woodhead Industries, Inc., Deerfield, IL (US)

( * ) Notice: Subject to any disclaimer, the term of this patent is extended or adjusted under 35 U.S.C. 154(b) by 0 days.

(21) Appl. No.: 10/919,628

(22) Filed: Aug. 16, 2004

(65) Prior Publication Data
US 2005/0039997 A1 Feb. 24, 2005

Related U.S. Application Data

(60) Provisional application No. 60/496,959, filed on Aug. 21, 2003.

(51) Int. Cl.
*H01R 13/00* (2006.01)
(52) U.S. Cl. .......................... 191/12.4; 439/4; 439/501
(58) Field of Classification Search ........... 191/12.2 R, 191/12.4; 439/4, 501, 652; 174/50, 52.1, 174/53, 54, 58
See application file for complete search history.

(56) References Cited

U.S. PATENT DOCUMENTS

| 2,979,576 | A |   | 4/1961  | Huber |
|-----------|---|---|---------|-------|
| 3,056,863 | A |   | 10/1962 | Johnson |
| 3,811,004 | A | * | 5/1974  | Moore .......................... 174/67 |
| 4,114,736 | A |   | 9/1978  | Scherenberg |
| 4,138,177 | A | * | 2/1979  | VAN Valer .................... 439/4 |
| 4,725,697 | A |   | 2/1988  | Kovacik |
| 5,236,371 | A |   | 8/1993  | Matthis |
| 5,700,158 | A | * | 12/1997 | Neiser et al. ............... 439/501 |
| 5,701,981 | A | * | 12/1997 | Marshall et al. ........... 191/12.4 |
| 6,648,677 | B1| * | 11/2003 | Boyd ......................... 439/501 |

* cited by examiner

*Primary Examiner*—Mark T. Le
(74) *Attorney, Agent, or Firm*—Emrich & Dithmar LLC

(57) ABSTRACT

An electrical cord reel includes a metal housing of rectangular shape which is adapted to be mounted set in a wall or on the surface of the wall. The electric cord is mounted on a retractable reel mounted within the housing and may be connected to a source of electricity. An outlet receptacle is mounted to the cord for supplying power to remote locations in the room or work area as the cord is unwound from the reel. A series of guide rollers permit the cord to be paid out in a direction generally perpendicular to the wall, but over a large space for flexible application. The receptacle may be reeled in for storage and used as a wall outlet in the storage position. The receptacle is secured in a recess in the front wall of the housing; and the receptacle may be moved from the storage position to a release position where it is readily removed from the housing for remote use.

8 Claims, 6 Drawing Sheets

ELECTRIC CORD REEL

RELATED APPLICATION

Applicant claims priority benefit of provisional application No. 60/496,959, for "ELECTRIC CORD REEL", filed on Aug. 21, 2003.

FIELD OF THE INVENTION

The present invention relates to electric cord reels wherein the electric cord is equipped with an outlet box or receptacle, for supplying temporary, portable electric power for industrial, commercial or residential use.

BACKGROUND AND SUMMARY OF THE INVENTION

Portable electrical outlet receptacle connected to electrical supply cords are widely used to provide a flexible, convenient means for supplying electrical power in a building or room. Sometimes the electrical cord is mounted to a reel so that the length of cord which is not needed for a particular application is stored on the reel, and the cord is completely wound onto the reel after use for storage.

Prior devices include those described in U.S. Pat. Nos. 2,979,576; 3,056,863; 4,114,736; 4,725,697; and 5,236,371. Many prior attempts are not directed to units adapted for semi-permanent mounting on or in a wall.

Wall mounted electric cord reels tend to be bulky, taking up inordinate amounts of space when mounted, particularly when they are mounted to the surface of a wall. Further, electric cord reels generally are difficult to mount in areas having low ceilings or in otherwise cramped spaces. It is also a disadvantage of certain wall-mounted cord reels that the cord is unwound in a direction parallel to the wall, with no provision to direct the cord away from the wall toward the area of intended use of the outlet receptacle.

It is desirable to mount electric cord reels having a portable outlet receptacle in locations that may have low profiles but which are convenient, and capable of being installed without an inordinate amount of time or expense.

The present invention provides an electric cord reel adapted for general purpose use, and which allows the unit to be mounted either wholly set into a wall cavity, or directly to the surface of the wall using conventional fasteners such as screws and wall anchors. All of the components of the unit are located within a metal housing which may serve as an electrical box.

The reel may be conventional and includes a spool which receives and stores the electrical cord. The spool typically includes a rewind device such as a metal clock type spring to rewind the cord onto the reel for storage. The cord may, however, be extended outwardly of the cabinet housing in a direction perpendicular to the plane of the wall on which or in which the unit is mounted. The distal or free end of the electric cord is provided with an electrical outlet receptacle to provide portable power over a wide area. The use area depends, of course, on the length of the cord. As used herein, the term "outlet receptacle" is intended to be broad. As persons skilled in the art will appreciate, the outlet receptacle could equally well be an outlet box or a single, duplex or more receptacles in a portable unit.

The front cover of the housing is provided with an elongated, tapered opening leading to a holder for the outlet receptacle in the storage position when the cord is fully retracted into the housing. The receptacle holder has a taper corresponding to the opening in the front cover, but the width of the cover opening is less than the width of the receptacle so that when the receptacle is in a lower, storage position, the front cover of the housing traps the receptacle. Thus, the receptacle may be used as a wall outlet in the storage position since it is secured and captured by the front of the housing, yet is readily accessible through the front opening in the cover.

The length or height of the front opening is longer than the length of the outlet receptacle so that the outlet receptacle can be slid along the holder to a removal position at the top of the opening, permitting the outlet box to be manually removed from the holder, and the cord to be unwound from the reel for use. As with conventional cord reels, a pawl and sprocket arrangement secures the cable in the unwound position but, upon further pulling, as with some tape measurers, the cord may be rewound fully by the automatic take-up reel.

A series of guide rollers are mounted within the housing for guiding the cord as it is unwound from the reel through the holder and the opening in the front cover of the housing. This enables the cord to be unwound from the reel along a plane generally parallel to the wall, but then the cord is guided and turned approximately 90° by the guide rollers so that as the cable leaves the opening and the holder, it may be pulled in a direction generally perpendicular to the wall and directed over a wide range of angles, laterally or vertically, relative to the opening in the front wall of the housing to provide greater flexibility of application and use.

A bezel may be provided for use when the unit is mounted within a wall cavity. The bezel may be a plastic frame provided with clips for snapping the bezel on the cover after the unit is mounted within a wall. The bezel covers the inner edge of the mounting opening and overlaps the edge of the front panel of the housing to provide a professional, finished look.

Other features and advantages of the present invention will be apparent to persons skilled in the art from the following detailed description of a preferred embodiment accompanied by the attached drawings wherein identical reference numerals are used for similar parts in the various views.

DETAILED DESCRIPTION OF THE ILLUSTRATED EMBODIMENT

Figure 1:
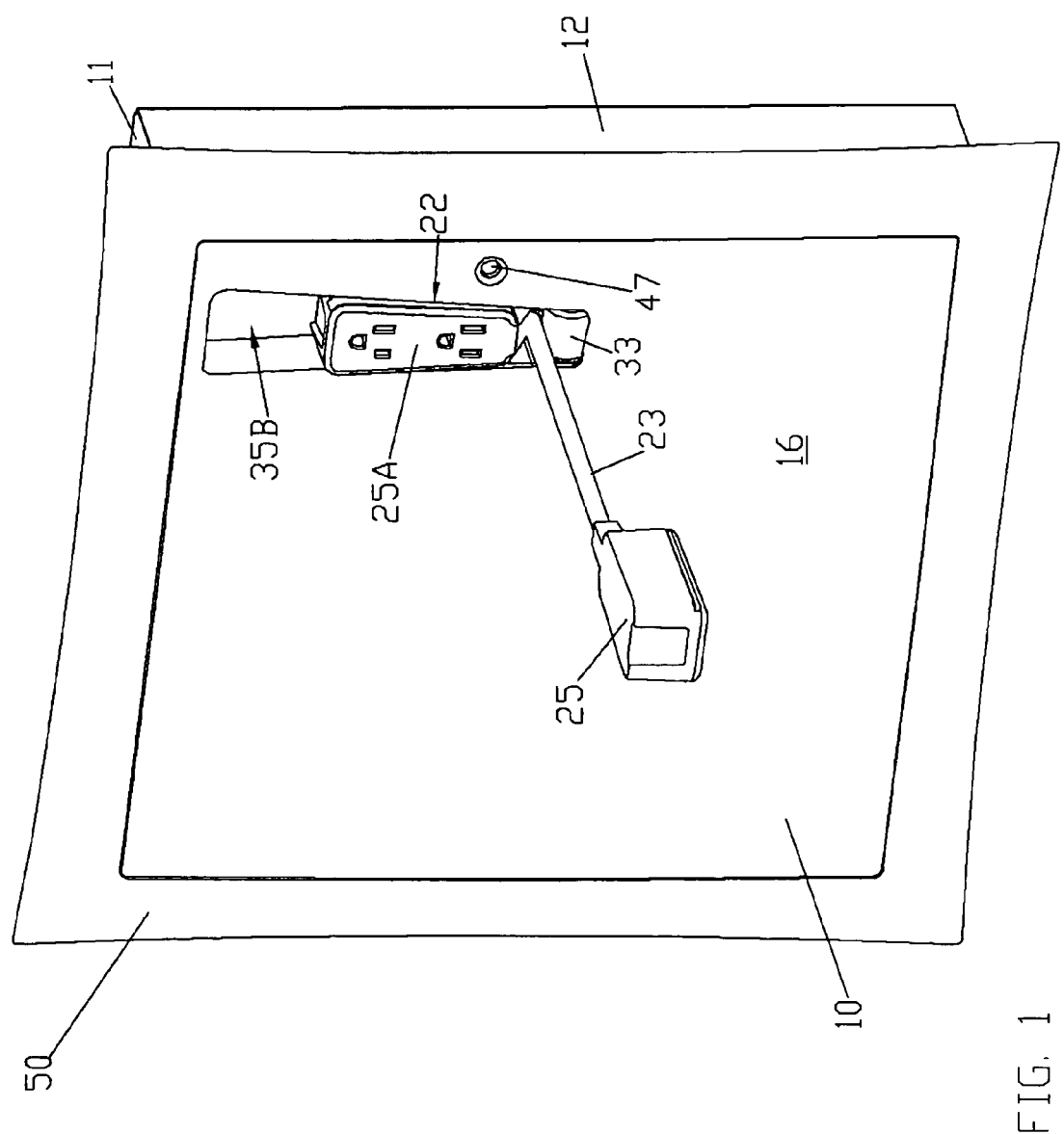
FIG. 1 is a perspective view of the electric cord reel housed in an enclosure with a portable outlet receptacle constructed according to the present invention, taken from a lower, frontal, right perspective.
Figure 2:
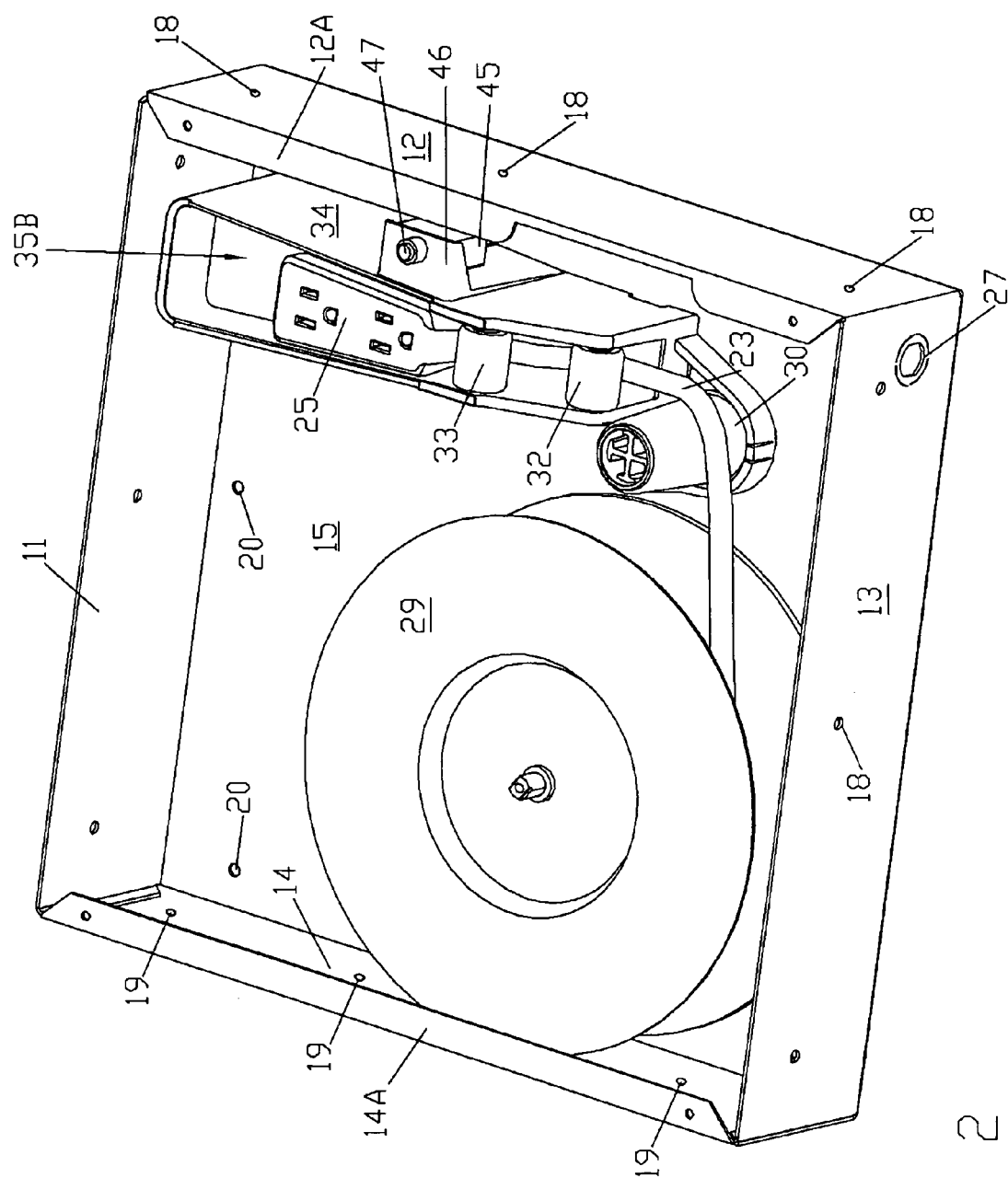
FIG. 2 is a perspective view of the apparatus of FIG. 1 with the front cover removed, taken from a lower, frontal, right perspective.

Referring first to FIG. 1, reference numeral 10 generally designates a housing which may be made of sheet metal and forms an enclosure. The housing 10 has a generally rectangular shape, including a top wall 11, a right side wall 12, a bottom wall 13 (FIG. 2), a left side wall 14, a rear wall 15 and a removable front cover 16. As seen in FIG. 2, the front edges of the side walls 12, 14 may be struck inwardly to provide vertical mounting flanges 12A and 14A for the front cover 16 which may be secured to the flanges 12A, 14A by means of conventional threaded fasteners such as sheet metal screws.

The spacing of the side walls 12, 14 of the enclosure 10 is such that the side walls may be mounted to opposing surfaces of adjacent studs in a wall; and the depth of the housing (i.e. the distance between rear wall 15 and cover 16) is such that the entire housing may, if desired, be mounted within the wall with the outer surface of the front cover 16 flush with the surface of the wall.

In this case, a plastic bezel 17 (FIG. 1) may be attached to the housing 10 to bridge the edge of the opening in the wall and the edge of the cover 16. For purposes of mounting the unit set in a wall, the side walls 12, 14 of enclosure 10 are provided with mounting apertures such as those designated 18 in side wall 12 and 19 in side wall 14 for receiving mounting fasteners, which again may be wood screws or metal screws, depending on the material of the mounting studs. The back wall 15 is provided with apertures such as those designated 20 for mounting the unit to the surface of a wall, if desired, by means of conventional wall fasteners, or to a rear or outside wall in the case where the unit is set within a wall and the spacing of the wall studs is greater than the width of the housing 12.

Still referring to FIG. 1, an elongated opening 22 is formed in the cover 16 behind which is mounted a storage holder, designated 35 in FIG. 2, for the outlet receptacle 25, as will be further described. An electrical cord 23 is stored on a cord reel generally designated 24 in FIG. 2, and described further below. At the outer or distal end of the cord 23, an electrical outlet receptacle generally designated 25 is mounted. Since the outlet receptacle supplies power, the connector elements of the duplex receptacle illustrated are female.

Before describing the components just identified in further detail, it will be helpful to understand their function and operation, in a general sense. When the cord 23 is fully wound on the cord reel 24, the outlet receptacle 25 is received in the holder 35 behind opening 22 in the front panel 16; and the outlet receptacle is placed by hand in the lower portion of that opening, assisted in seating by the pull of the rewind or "reeling" force on the cord 23. This forms a retaining position in which the outlet receptacle 25 (as seen in dash line at 25A in FIG. 1), is securely retained in the holder and may be used as a conventional wall outlet (see position 25A in FIG. 1).

Figure 3:
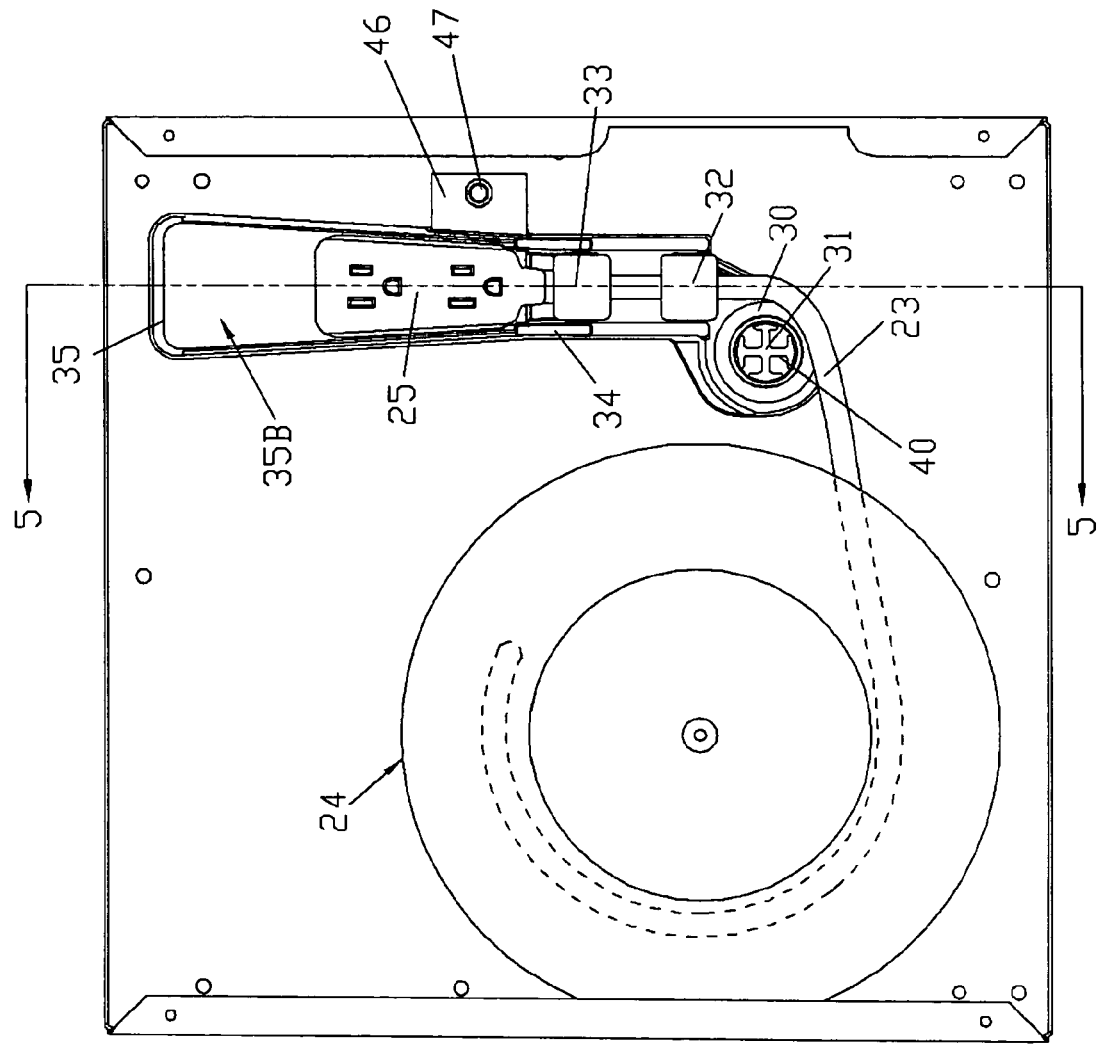
FIG. 3 is a front view of the apparatus of FIG. 2.
Figure 4:
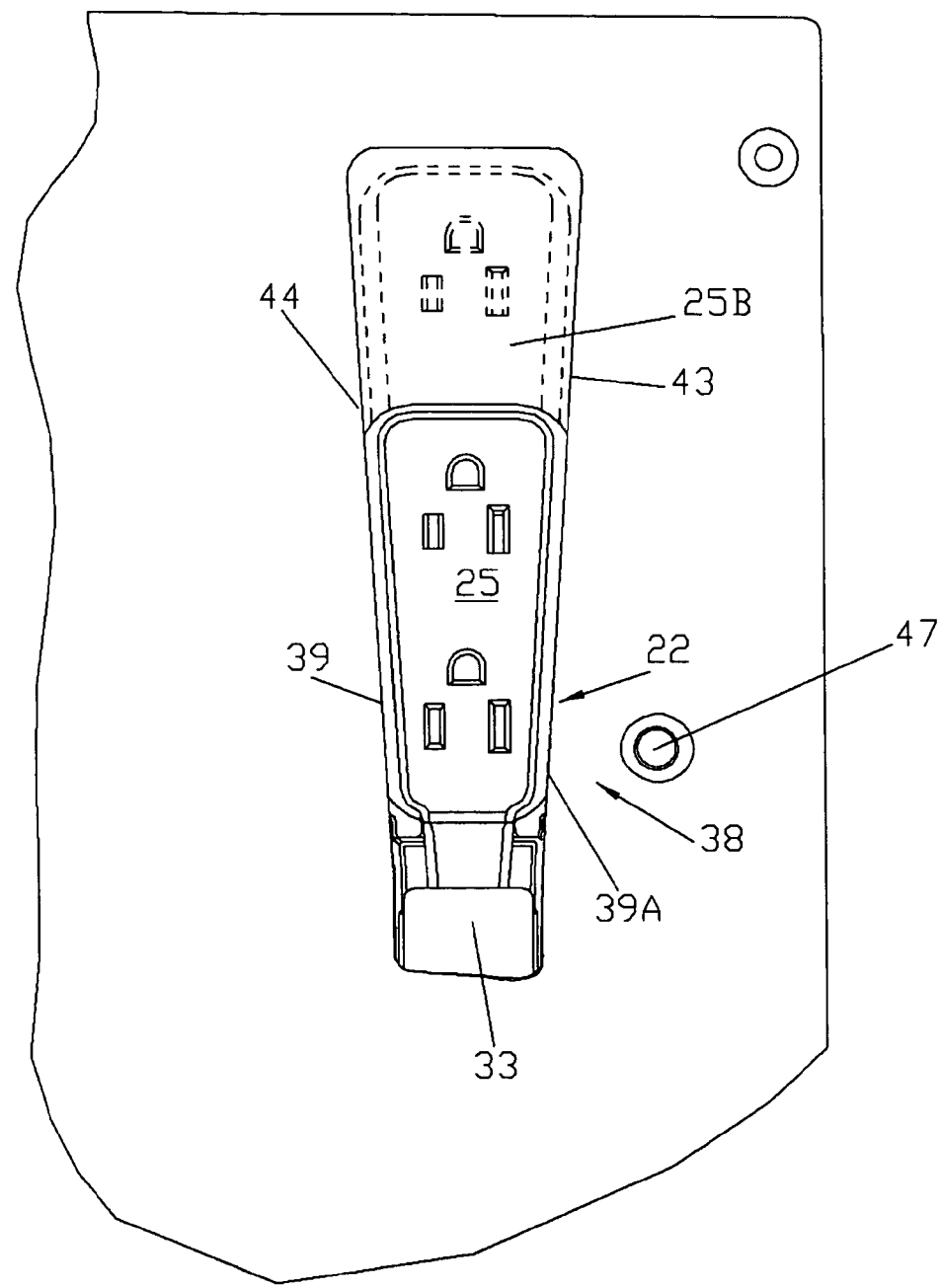
FIG. 4 is a close-up view showing the portable receptacle in the storage recess of the housing, for use as a wall outlet, with the receptacle in phantom in the release position for extending the cord and receptacle for use.

The sides of the receptacle are tapered as seen in FIGS. 2–4 so that the receptacle 25 becomes progressively more narrow toward the cord 23. The opening 22 in the cover 16 is similarly shaped but defines an opening which is slightly more narrow than the width of the tapered receptacle 25. This secures the receptacle in the holder 35 mounted behind the opening 22 when the receptacle 25 is placed in the bottom of the holder (as seen in solid line in FIGS. 1, 3 and 4), but frees the receptacle for complete removal from the holder 35 when it is slid to the upper portion of the tapered holder 35, as seen in phantom in FIG. 4. That is, when it is desired to supply power at a remote location, the user manually slides the outlet receptacle 25 upwardly in the holder 35 to the upward portion of the opening 22 from which the outlet receptacle may be removed from the housing 10, as seen in solid line in FIG. 1; and the cord 23 may then be further unwound from the reel 24 for positioning the receptacle at any location within a range defined by the length of the cord 23.

In the illustrated embodiment, the outlet receptacle 25 is in the form of an overmolded tapered duplex receptacle as seen in FIG. 3. Alternatively, conventional outlet boxes with metal casings or other suitable outlet receptacles with tapered side walls may be used.

The cord 23, in the illustrated embodiment, comprises three insulated wires preferably of stranded copper and having an overmolded outer sheath, as is conventional.

The electric cord reel 24 is also conventional and may be acquired, for example, from Aeromotive Manufacturing Company of Kalamazoo, Mich. Briefly, electric cord reels are adapted to have the inner or proximal end of the cord 23 more permanently connected to a source of electricity which, in the instant case, can be provided either by rigid conduit connected to one of the apertures such as that designated 27 in FIG. 2 in bottom wall 13, or on a side wall of the metal housing 10. Alternatively, the feed cable can be armored cable or, if the local code permits, a flexible, jacketed feed cable. Electric cord reels typically include a terminal block for establishing connections between a feed cable and inner collector rings for distributing power to the electric cord 23. The distal or inner end of the cord 25 is seen in FIG. 3, and may be mounted to the distribution portion of the collector rings (not shown). Electrical cord reels also include a spring, similar to a clock spring, for biasing the reel to the wound position (i.e. clockwise as seen in FIG. 2). Electrical cable reels also typically include a pawl and ratchet mechanism so that when the cord is unwound from the reel and stopped, the pawl and ratchet mechanism engages the reel and holds it in that position until the cord is further pulled, in which case the pawl and ratchet mechanism disengages; and the cord may then be rewound, or the cord may pulled further to a second, latched position. All of these features and operations are well known in the industry, and, as indicated, commercially available; and preferred in the present invention.

The electric cord reel 24 is shown in FIG. 2, and it is mounted to the rear wall 15 of the enclosure 10 by a suitable mounting bracket or plate, or it may be directly mounted to the rear wall 15. The electrical source feed cord may be routed through openings (preferably provided with knockouts such as 27 in bottom wall 13) in the side, bottom or top walls or in back wall 15.

Figure 5:
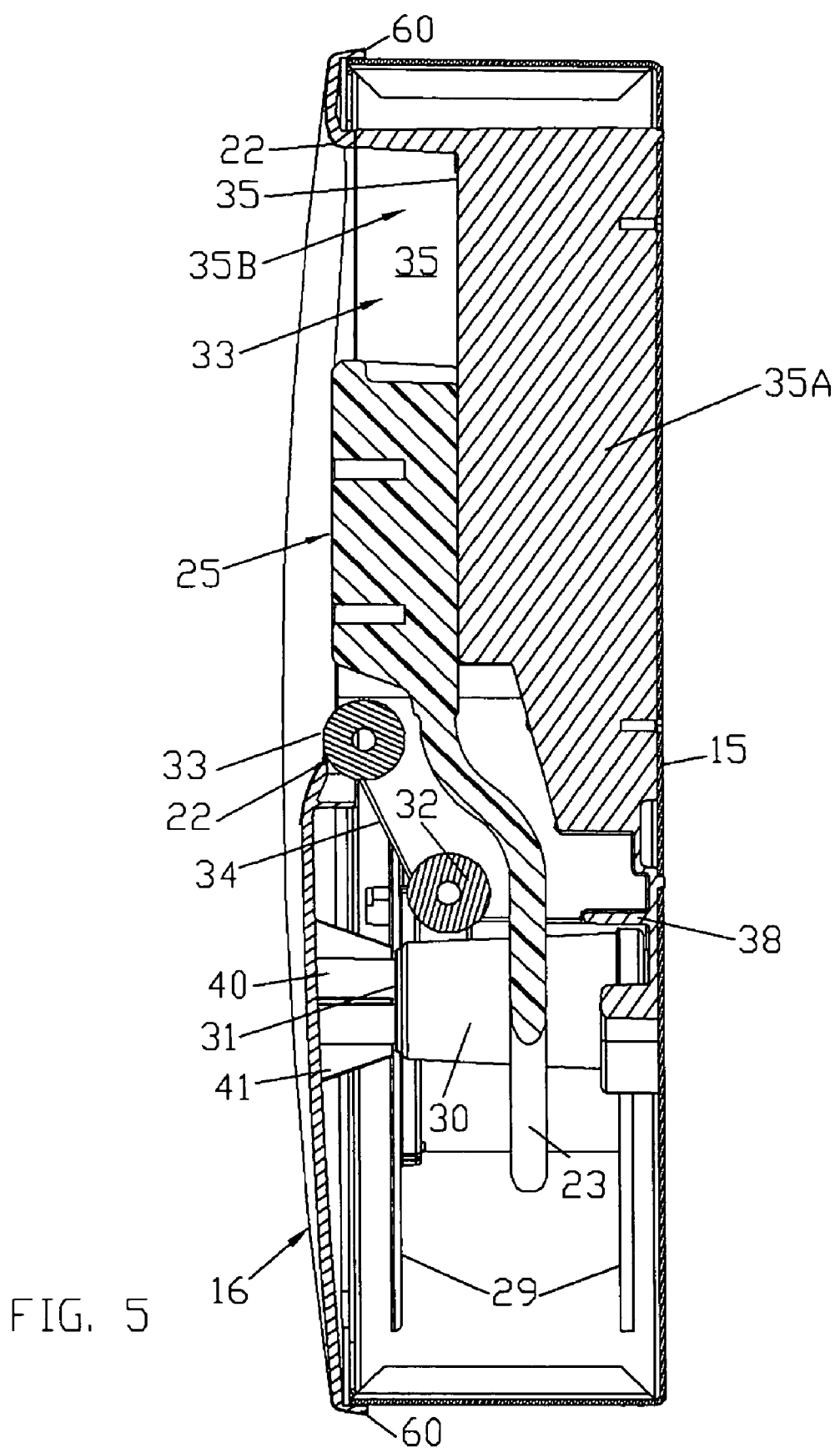
FIG. 5 is vertical cross-sectional view taken from the right and through the sight line 5—5 of FIG. 3.

Turning now to FIGS. 2, 3, and 5, as the electrical cord 23 exits the spool 29 of the cord reel 24, it is guided by a series of rollers or spools. The guide rollers include a first guide roller 30 which is mounted by a spindle 31 to the rear wall 15 of the housing 10 by bracket 38 and is adapted to rotate about a horizontal axis generally parallel to the axis of rotation of the reel 24 (i.e. extending left to right in FIG. 5). A retainer 40 having flared wings 41 assists in maintaining the cord 23 on roller 30. Second and third (lower and upper) rollers 32, 33 are mounted to a U-shaped channel extension 34 of the metal holder 35 which is, in turn, mounted to the rear wall 15 of the cabinet 10.

The holder 34 may be of molded plastic including a brace or rib 35A (FIG. 5) defining a cavity 35B of the holder 34 which receives the electrical receptacle 25.

The cable 23 is routed around the first guide roller 30, and then to the rear of the lower roller 32 and the upper roller 33. It will be observed from FIG. 5 that the axes of rotation of the rollers 32, 33 are horizontal but generally perpendicular to the axis of rotation of the first guide roller 30. The upper guide roller 33 is spaced slightly forwardly of the lower or intermediate guide roller 32 and positioned higher relative to the lower, horizontal edge of the opening 22 in front panel 16 to par out the cord without scraping. In this manner, the cord is in partial wrapping engagement with lower roller 32 (approximately 30°–50°) and with the upper roller 33 (approximately 30°–70° depending on the angle at which the outlet receptacle is pulled). This double roller arrangement reduces bending stress on the cord as it is pulled out of the housing 10 and permits the receptacle 25 to be snugly seated in holder 35 in the storage position of FIG. 5.

The cavity 35B of holder 35 has an open bottom (FIG. 5), permitting the electrical cord 23 to be moved freely through the bottom of the holder 35 via channel 34, and then pulled outwardly of the upper portion of front opening 22 of the housing when the electrical receptacle 25 is raised to the upper portion of the holder 35, illustrated in phantom in FIG. 4.

It will be observed that whereas the electrical cord 23 originally is unwound in a horizontal lateral direction perpendicular to the axis of rotation of the spool 29, it nevertheless is conveniently and reliably re-routed approximately 90° upwardly and then horizontally and outwardly such that when the electrical cord 23 is extended from the housing 10, as seen in FIG. 1, it may be moved in a direction generally parallel to the axis of rotation of the spool 29 of the cord reel. Due to the flexibility of the cord it may be moved in a wide range of angles as it exits the opening 23 for access to any region in front of the housing 10 within the length of the cord 23.

The roller 30 defines a conical angle, which acts in combination with retainer 40, to guide the electrical cord toward the center of the reel 29 as it is re-wound onto the reel from rollers 32 and 33. The winding action may otherwise urge the cord toward the rear of the reel. It will also be appreciated that as the cord unwinds from the reel, it will be taken from different locations relative to the flanges of the spool 29, and it is desired that the feed angle of the cord 23 to the rollers 32, 33 be as uniform as possible in order to avoid binding or snagging of the cord.

Turning now to FIGS. 1 and 4, the housing access aperture 22 leading into the holder 35 has a lower portion generally designated 38, and defined by lateral edges 39, 40 which taper upwardly and outwardly from the bottom of the aperture 22. The upper section 36 of receptacle 25 is similarly tapered. The body of receptacle 25 has left and right sides which also have a similar taper.

The width of the aperture 22 at the bottom of the lateral edges 39, 40 is narrower than the width of the outlet receptacle 25. Thus, when the outlet receptacle is at the bottom of the cavity 35B, it is secured in a storage position and cannot be removed from the recess by direct outward motion. The outlet receptacle is thus captured in the lower portion of the recess defined by the aperture 22, and may be used, in this position, as a conventional electrical wall outlet. However, a user may place his or her fingers at the top and bottom of the recess and slide the receptacle 25 upwardly in the holder 35 to the removal position shown at 25B in FIG. 4.

In the removal position, it will be observed that the upper section of the aperture 22 has inclined side edge sections 43, 44 which are spaced even further apart than lower edges 39,40, and provide sufficient room to permit the upper free end of the outlet receptacle 25 to be tilted outwardly and removed from the holder 35. The outlet receptacle may be re-seated back into the holder, when desired, as the cord is rewound onto the reel 24 and the cord passes over the guide rollers 33, 32 and 30 in the rewind operation. To re-seat the receptacle, the cord end of the outlet receptacle 25 is first placed into the wider upper portion of the aperture 22 and positioned rearwardly of the holder 35 and then the bottom portion of the electrical outlet receptacle is simply slid downwardly in cavity 35B of the holder 25 to the storage position shown in 25A in FIGS. 4 and 5 where it is secured.

Referring to FIGS. 1, 2 and 4, a circuit breaker 45 is mounted to a bracket 46 secured to the holder 34. The circuit breaker 45 includes a reset button 47 which, as can be seen in FIGS. 1 and 4, extends through the aperture in the cover 16.

Figure 6:
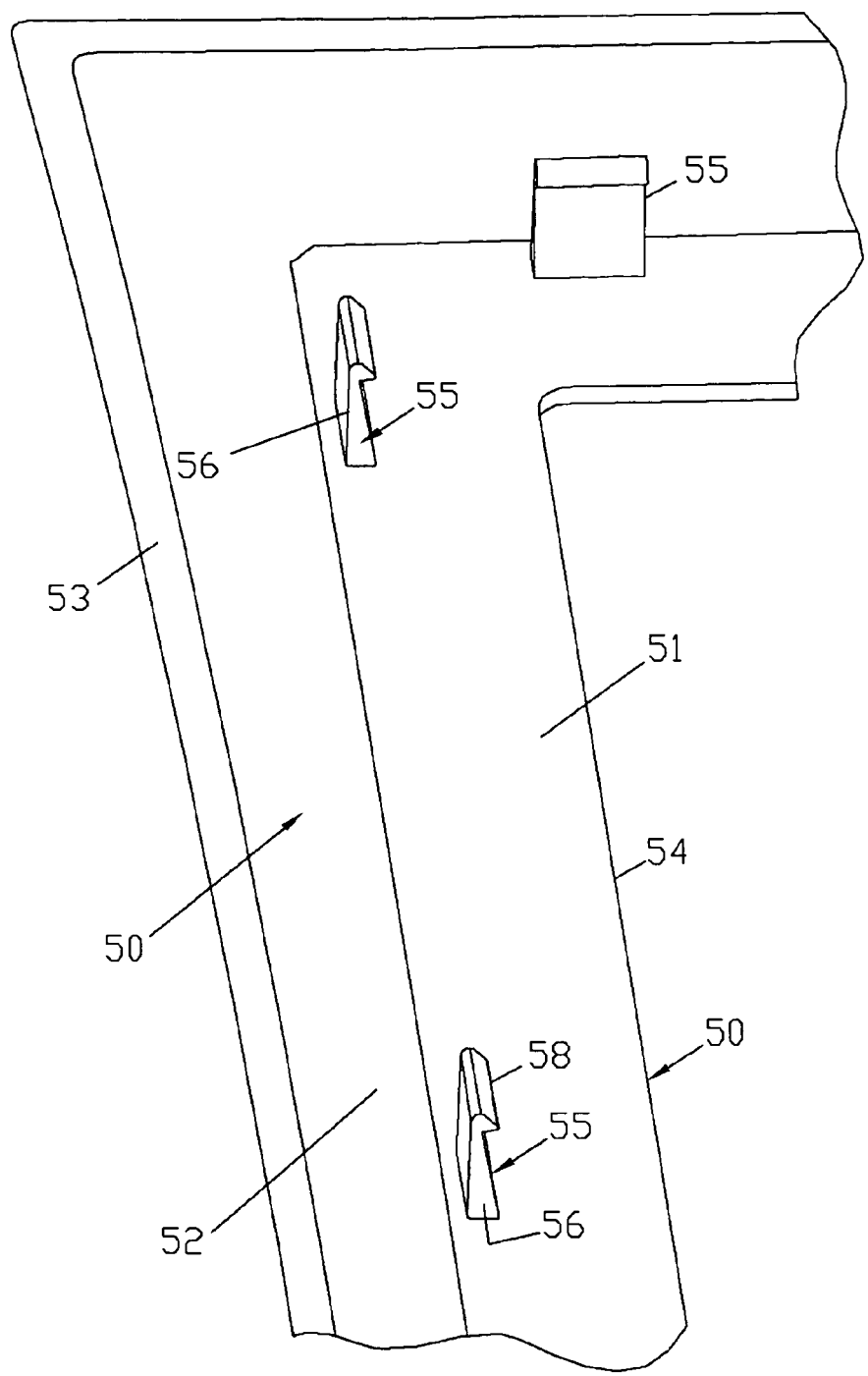
FIG. 6 is a perspective view of a cover fragment of the rear of the bezel which may be used to finish an in-wall installation of the housing.

Turning now particularly to FIGS. 1 and 6, a rim for bezel 50 is provided for primarily esthetic purposes. When the cord reel is installed in a wall, for example, it is difficult to form an opening in the wallboard which will be flush with the sidewalls of the housing. The bezel 50 accomplishes this purpose. The bezel 50 has a generally rectangular shape, conforming to the outline of the housing 10. The bezel may be formed or molded of plastic, preferably, but it could be made of other materials, including metal.

The bezel 50 includes an inner rectangular portion 51 which is generally parallel to the cover 16 of the housing 10 when the bezel is mounted to the housing, as will be described. Outwardly of the inner portion 51 is a flange 52 which preferably is tapered rearwardly and defines a flat peripheral edge 53 intended to engage the surface of the wall in which the housing is mounted, and be flush with the wall surface. The inner edge 54 of the inner portion 51 of the bezel 50, of course, is dimensioned to be less than the cross-section of the housing 10 so that the inner portion 51 overlaps the cover 16 when the bezel is assembled to the housing.

The bezel is assembled to the housing by means of a plurality of clips designated 55 in FIG. 6. Each of the clips 55 has a base portion 56 which is molded integrally with the inner surface of the inner portion 51 of the bezel, and a formed barb or hook portion 58. The height of each of the clips 55 is such that when the inner flat portion 51 of the bezel is pressed flush against the outer surface on the front cover 16, the barbed portion 58 of the clip fits around and locks with the rearwardly turned outer flange 60 of the cover 16 (see FIG. 5). Observe from FIG. 6 that the corner of the bezel 50 is provided with two clips 55 adjacent the corner and extending in orthogonal directions. The corner clips provide a secure attachment of the bezel to the cover 16, yet because of the length of its sides, the bezel is flexible enough that it may be removed manually from the cover 16.

Having thus disclosed in detail an embodiment of the invention, persons skilled in the art will be able to modify certain of the structure which has been shown and substitute equivalent elements for those described while continuing to practice the principle of the invention; and it is, therefore, intended that all such modifications and substitutions be covered as they are embraced within the spirit and scope of the appended claims.

We claim:

1. An electric cord reel comprising:
   a housing having side walls, a back wall and a removable cover, at least one of said walls including an opening or knockout for receiving electrical feed wires;

a cord reel mounted to said back wall for rotation about a generally horizontal axis generally perpendicular to said front wall of said housing;

an electrical cord received on said reel;

an electrical outlet receptacle on a free end of said cord;

a plurality of rollers routing said cord from said reel to a direction generally parallel to said axis of rotation of said reel; and a holder for said receptacle mounted within said housing for receiving said electrical outlet receptacle;

said front wall of said housing defining an opening adjacent said holder and characterized as having tapered side edges defining a relatively narrow portion for securing said electrical outlet in a storage position in said holder, and a relatively wider portion permitting said outlet and said cord to be removed from said holder in a direction generally parallel to said axis of rotation of said reel.

2. The apparatus of claim 1 wherein said plurality of rollers comprises:

a first roller adapted for rotation about an axis generally parallel to an axis of rotation of said reel for receiving said cord from said reel and permitting said cord to be moved in a generally upright direction;

a second roller adjacent said first roller and mounted to said holder for rotation about a horizontal axis transverse of the axis of rotation of said first roller; and a third roller mounted to said holder mounted for rotation to said holder about an axis parallel to the axis of rotation of said second roller and spaced therefrom in a direction toward the direction in which said outlet receptacle and cord are paid out, thereby reducing the strain on said cord when said outlet receptacle is removed from said holder and pulled in a generally horizontal direction parallel to the axis of rotation of said reel.

3. The apparatus of claim 1 wherein said outlet receptacle comprises a duplex electrical receptacle and characterized in that when said outlet receptacle is in said storage position in said holder, said outlet receptacle is secured by said cover and may be used as a wall outlet.

4. The apparatus of claim 1 wherein said opening in the front wall of said housing includes first and second side edges tapered in a vertical direction to define said opening having increased width toward the top, and wherein said outlet receptacle has first and second sides tapered in accordance with the taper of said side edges of said opening, said opening in said front cover corresponding generally to the shape of said holder adjacent said outlet with said side edges of said opening located slightly closer to one another than said sides of said outlet receptacle such that said outlet may be moved upwardly in said holder and removed through the upper portion of said opening in said front wall of said housing.

5. The apparatus of claim 1 wherein said first and second side walls of said housing defines apertures for receiving fasteners to secure said housing to wall studs.

6. The apparatus of claim 1 wherein said side walls of said housing are spaced to fit between adjacent wall studs for mounting said housing within a wall.

7. The apparatus of claim 6 further comprising a bezel sized to overlap a front edge of said cover and extend outward of said edge to bridge over an opening in a wall in which said housing is installed.

8. The apparatus of claim 7 wherein said front cover includes peripheral flanges turned rearwardly, and said bezel includes a plurality of clips for releasably securing to said peripheral flanges of said cover.

* * * * *